M. ZAVARKIN.
REFRIGERATOR.
APPLICATION FILED JAN. 2, 1918.
1,283,017.
Patented Oct. 29, 1918.
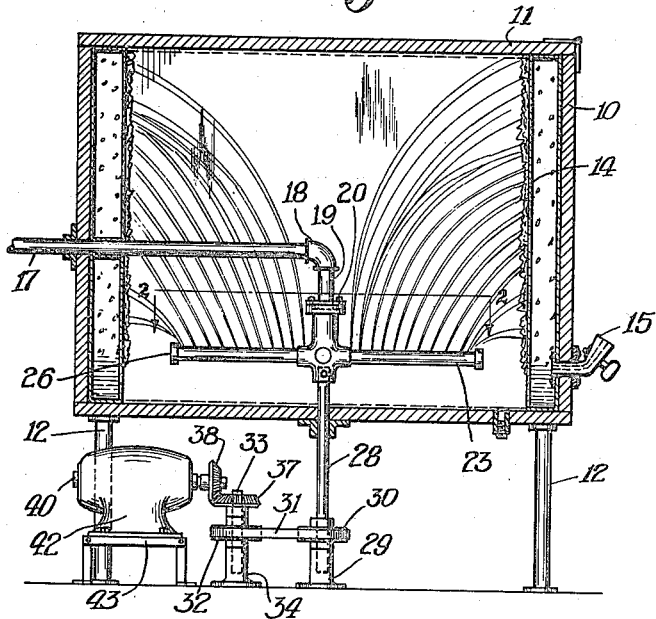
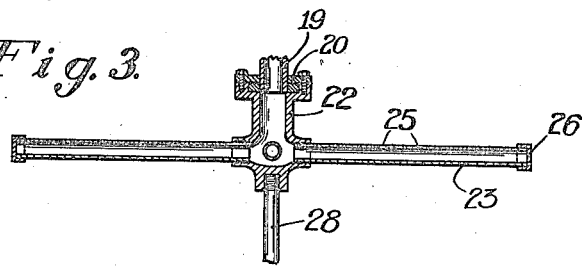
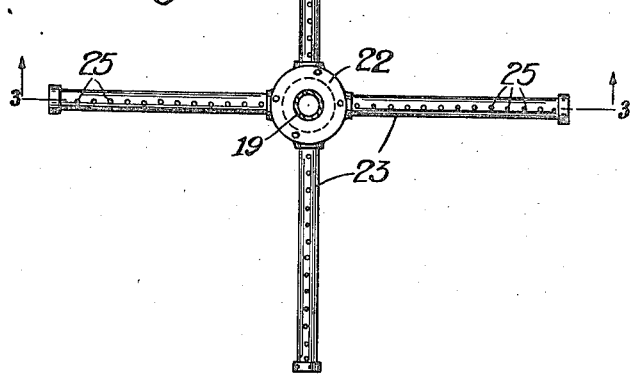
INVENTOR
Maxim Zavarkin
BY
ATTORNEY

UNITED STATES PATENT OFFICE.

MAXIM ZAVARKIN, OF EAST BRIMFIELD, MASSACHUSETTS.

REFRIGERATOR.

1,283,017.  Specification of Letters Patent.  Patented Oct. 29, 1918.

Application filed January 2, 1918. Serial No. 209,931.

*To all whom it may concern:*

Be it known that I, MAXIM ZAVARKIN, a citizen of Russia, resident of East Brimfield, county of Hampden, and State of Massachusetts, have invented certain new and useful Improvements in Refrigerators, of which the following is a specification.

This invention relates to improvements for machines for making ice and has as its special object the provision of a compact apparatus which may be installed in a dwelling or other places where a supply of ice is desirable.

A further object is to provide means whereby a spray of water is formed into ice by the use of suitable chemicals arranged in a casing enveloping the spray chamber, and which can be removed therefrom in pieces in a convenient manner.

These and other like objects are attained by the novel construction of parts hereinafter described and shown in the accompanying drawing, forming a material part of this specification, and in which—

Figure 1 is a vertical sectional view showing an ice machine made in accordance with the invention.

Fig. 2 is a horizontal sectional view taken on line 2—2 of Fig. 1, and

Fig. 3 is a fragmental vertical sectional view showing the arrangement of parts.

A chamber 10, here shown to be rectangular, is provided with a cover 11, and supported by columns 12, on any suitable level foundation and inclosed within the chamber 10, juxtaposed to the side walls thereof, is a hollow casing 14, through which is circulated a volatile refrigerant or brine in the usual manner, instead of which a freezing mixture may also be used which is renewed from time to time as the mixture becomes exhausted, and said volatile refrigerant or freezing mixture are supplied to the casing through a pipe 15.

Entering the chamber is a water pipe 17, same terminating in an elbow 18, in the other opening of which is engaged a downwardly extending pipe 19, passing through the disk 20, which is engaged within a rotating head 22, from which leads four tubular branches 23, these provided with a plurality of perforations 25, the same being directed toward the upper part of the chamber 10, the tubes having caps 26 at their ends, so as to force the current of incoming water entering from the pipe 17, outward in the form of a spray within the chamber 10.

Opposite to the inlet 20, in the head 22, is secured a vertical shaft 28, the same extending through the bottom of the chamber 10, and being rotatably mounted in a bracket 29, immediately above which is secured a pulley 30, driven by a belt 31, from another pulley 32, mounted on a vertical shaft 33, housed in a support bracket 34. At the upper end of the shaft 33, is a gear 37, connecting with the mating gear 38, the same being secured upon the shaft 40, of a motor 42, mounted upon the bracket 43, secured to the foundation.

Upon the motor 42, being energized, power will be conducted through the shaft 28, causing the spray head to rapidly rotate within the chamber 10, forcing the spray through the perforations 25, so as to strike upon the inner walls, so that the ice is rapidly formed upon its inner sides and which is accessible by raising the door 11 and removing the ice in an obvious manner. It being understood that water is supplied through the pipe 17, and so long as the motor is kept in operation, ice will be formed and caused to adhere to the inner walls of the chamber to any desired thickness.

Having thus described my invention what I claim as new and desire to secure by Letters Patent is,

In an apparatus for producing ice of the character described, the combination of a casing, a jacket in said casing adapted to be supplied with a volatile refrigerant, or a freezing mixture for circulation therein, a supply pipe for said refrigerating medium, a central ice chamber in said casing, a water supply pipe for said chamber, a disk secured to the inner end of said pipe, a rotating head in engagement with said disk, four tubular branches arranged to form a cross formed with said head and provided with a plurality of perforations directed toward the upper part of said chamber, caps at the ends of said branches, a tubular shaft secured to the head at a point opposite to said disk, extending through the casing, a bracket in which the tubular shaft is rotatably mounted, a motor, and means for rotating said shaft from said motor.

In testimony whereof I have affixed my signature.

MAXIM ZAVARKIN.